May 27, 1958  K. I. JOHNSON ET AL  2,836,057
APPARATUS FOR MEASURING HIGH DEGREES OF DRYNESS
Filed March 31, 1955  2 Sheets-Sheet 1
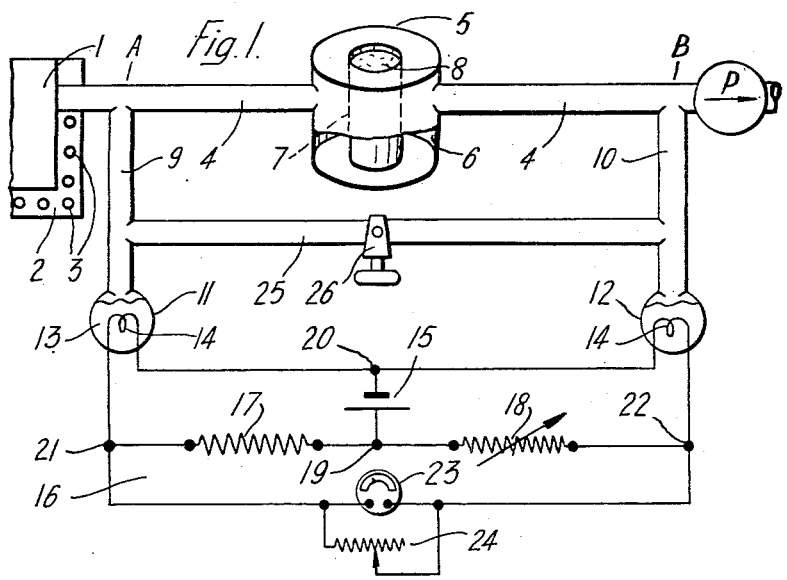
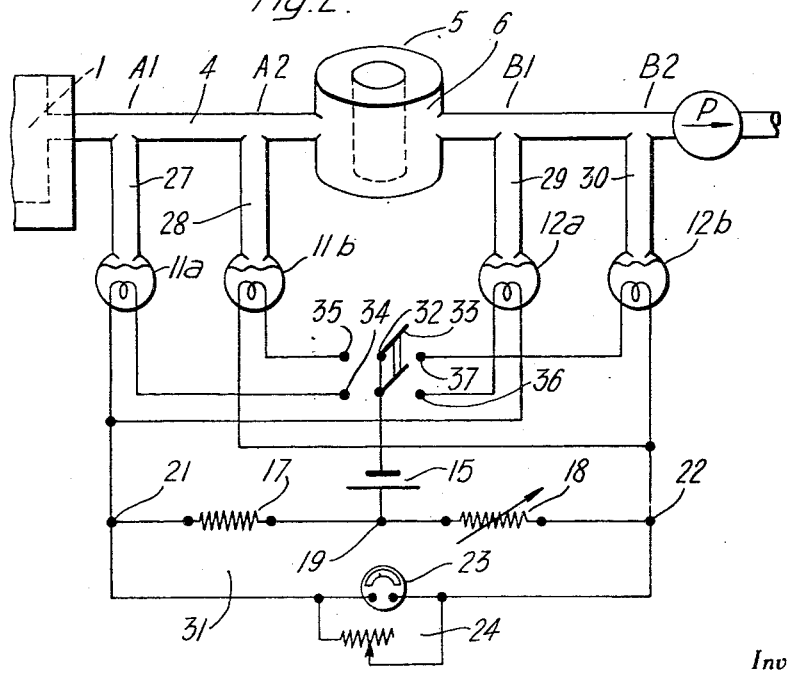
Inventors
Kenneth Ian Johnson &
Derek Howard Page
By
*Hoyes Leonards Duell*
their Attorneys

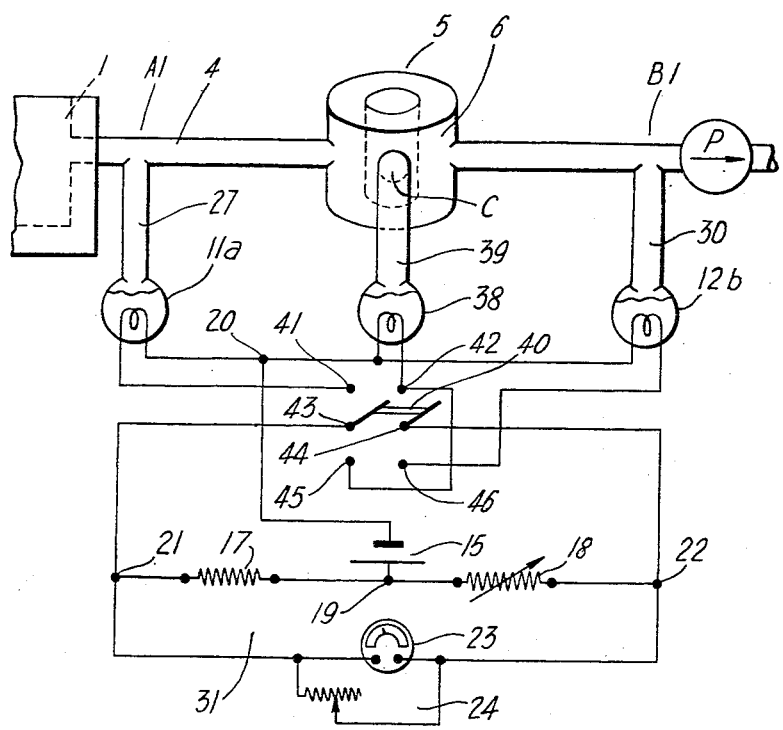

United States Patent Office 2,836,057
Patented May 27, 1958

2,836,057

APPARATUS FOR MEASURING HIGH DEGREES OF DRYNESS

Kenneth Ian Johnson, Moss Bank, near St. Helens, and Derek Howard Page, Sheffield, England, assignors to British Insulated Callender's Cables Limited, London, England, a British company Application March 31, 1955, Serial No. 498,411

Claims priority, application Great Britain April 8, 1954

3 Claims. (Cl. 73—29)

In the processes of drying paper, or articles comprising paper as a large constituent, for the purpose of obtaining desirable electrical properties and for other purposes, it is important to be able to recognise the approach to and attainment of completeness (within the limits of measurement of the instruments used) of the removal of moisture. Such drying processes, for instance, occur in the manufacture of electric capacitors and paper insulated electric cables, usually as a preliminary step to the impregnation of the paper with suitable liquid.

In accordance with the invention apparatus is provided for indicating the approach to completeness of drying which is particularly applicable where the removal is assisted by the application of vacuum. The principle adopted is that of observing and comparing the pressure conditions in a stream of gas coming off through a pipe from the paper at two points in the stream located before and after the stream has been treated for removal of the moisture which it carries. These conditions tend towards a definite relationship as the dryness of the stream coming off from the paper increases. The apparatus will also be applicable for use in other cases of ascertaining the removal of a gas or vapour from a mixture. Hereinafter the term "gas" is used to indicate either a gas or a vapor. In the simplest aspect of the invention two similar low pressure gauges, for instance vacuum gauges of the Pirani type, are connected by branch pipes to the pipe through which the stream of gas flows, one gauge being connected on the upstream side of the place of treatment for the removal of unwanted gas and the other on the downstream side. The means for removal of unwanted gas may, in the case of moisture, be of the type in which this is effected by intensive cooling as by the use of solid carbon dioxide or liquid air. The two gauge readings may be compared either on instruments associated with each gauge or by a device which indicates only the difference between the readings. Where the gauges are of the Pirani type their readings may be combined in an electrical bridge circuit.

In an alternative arrangement in accordance with the invention two similar pairs of gauges are arranged one on the upstream side and the other on the downstream side, each pair being spaced apart so that the resistance to flow between the upstream pair is equal to that between the downstream pair. The pressure gradient between the gauges in a pair can be ascertained by comparing their readings and the two pairs are arranged so as to indicate equal pressure gradients on the upstream and downstream sides when complete dryness of the stream has been attained. One of the gauges may be situated at the place of removal of moisture so as to serve as a common gauge for both pairs, co-operating with the upstream gauge for ascertaining the gradient on that side and co-operating with the downstream gauge for ascertaining the gradient there. In this way the number of gauges may be reduced to three. As in the arrangement involving only two gauges, the readings of the gauges in this arrangement of four or three gauges may be combined electrically.

In the apparatus with which the invention is concerned several different influences affect the pressure conditions at the two places of observation, that is on the upstream and downstream sides of the place at which the moisture is removed, and the differences between these pressures. The most important influences are the removal of moisture at the place of treatment and the resistance to flow of gas along the length of the pipe on each side of the place of treatment. The total effect of these influences can in many cases be taken into account by the arrangement which involves the use of two gauges only. Where these are the only influences present the readings of the gauges will approach equality as the dryness of the stream increases. In other cases, however, other influences are present which make it necessary or helpful to take additional pressure readings.

It will be understood that in applying the apparatus it will not usually be brought into use until a high vacuum has been attained and the dryness of the paper is well advanced. In the simple conditions just referred to, where the greater part of the stream coming from the paper consists of water vapour, the rate of flow in the main pipe of the observing apparatus is very much less after this moisture has been removed than before, so that the pressure gradient on the downstream side of the place of removal is much less than on the upstream side. As drying proceeds, the conditions lead to a low constant reading of pressure on the downstream side towards which the other reading approaches and to which it approaches very closely at the end of the drying process.

However, there may be disturbing influences which take the conditions away from those of the simple case. For instance, if there is a leak of comparatively dry air into the drying apparatus, this adds a pressure gradient throughout the apparatus, this being largely relative to the gradient which would otherwise exist on the downstream side of the place of treatment for moisture removal. In such a case the simple arrangement of two pressure gauges above described shows a tendency, as drying proceeds, to move not to equality but to a constant large difference. The value of this difference is not known in advance as it depends on the unascertained value of the leakage. This condition can be taken care of by the alternative arrangement of three or four gauges.

It has been assumed above that the upstream and downstream lengths of pipe have the same resistance to flow so that the same stream of gas through them will produce the same pressure gradients. It will, however, be recognized that other conditions can be provided for if advantageous or convenient for other reasons.

The invention will be illustrated by the following descriptions of examples of its embodiment and with reference to the accompanying diagrammatic drawings, wherein:

Figure 1 represents a dryness measuring apparatus using two vacuum gauges;

Figure 2 represents a dryness measuring apparatus using four vacuum gauges; and

Figure 3 represents modification of the arrangement shown in Figure 2, but using three gauges.

Referring first of all to Figure 1, the apparatus is arranged to give a measurement of the state of dryness of articles, for instance capacitors of the wound type having paper insulation, contained in a drying chamber 1. The chamber is a double-walled vessel, containing in the double wall 2 heating elements 3, and connected to an exhaust pump P by an exhaust pipe 4. The part of the apparatus constructed in accordance with this invention is connected into this pipe 4. Directly in the run of this pipe 4 is introduced a refrigerating vessel 5. This is a double walled annular cylindrical chamber 6 through which pass the gases drawn off from the heating chamber 1 by the exhaust pump P. The central part 7 of the refrigerating vessel 5 is a container for the refrigerant 8, which may be solid carbon dioxide or liquid air, so that a very low temperature is produced in the annular chamber 6. At points A and B on each side of the refrigerating vessel 5 are connected branch pipes 9 and 10 leading to vacuum gauges 11 and 13 respectively, of the Pirani type. Each gauge is a chamber 13 in which is enclosed an extended fine wire conductor 14 carrying heating current supplied by a battery 15, or other source of current, of approximately constant value. The interior of the gauge 13 is in communication with the associated branch pipe 9 or 10. The temperature, and consequently the ohmic resistance, of each filament 14 is determined by the degree of vacuum existing in the surrounding chamber 13. For the present purpose it is found that a lighting bulb containing a tungsten filament makes a satisfactory gauge.

The two elements 14 are connected, by means of leads taken in a gas-tight manner through the walls of their containers, as the two adjacent arms of a resistance bridge. The other two arms of the bridge 16 are made up by two external resistance elements 17, 18 of nearly equal value, the element 18, having the larger value, being made adjustable through an appropriate range. Across the bridge, between the junction point 19 of the last two mentioned resistance elements 17, 18 and the junction point 20 of the gauge elements 14, 14, is connected the battery 15. Across the other diagonal, that is between the junction 21 of one resistance element 17 and one gauge element 14 and the junction 22 between the other resistance element 18 and gauge element 14, is connected a sensitive current-measuring instrument 23. Connected in parallel with the instrument 23 is a variable resistor 24. Between the two branch pipes 9 and 10, by which the gauges 11 and 12 are connected to the exhaust pipe 4, is arranged a pipe 25 which by-passes the refrigerating chamber 6 and incorporates a valve 26 which can be opened and closed at will to complete or cut-off the passage through this pipe.

At the commencement of the use of this apparatus and before the pump P is set in operation, the valve 26 is opened so that the pressure conditions in the two gauges 11, 12 are equalized. The bridge 16 is then adjusted, by means of the adjustable resistance element 18, to bring the setting of the instrument 23 to zero. The valve is then closed and the actual drying process is started. The effect of the exhaust pump P is to draw out a stream of the moisture-containing atmosphere from the drying chamber 1 through the pipe 4 and refrigerated chamber 6. The moisture passing along the pipe 4 is condensed in the chamber 6 so that the moisture content at the position A, before condensation, is greater than at the position B, after condensation. Under these conditions the pressure at A exceeds that at B, and, since the gauges 11 and 12 are responsive to those pressures, the bridge 16 is unbalanced and the instrument 23 gives a reading determined by the difference between the pressures at A and B. As the drying proceeds the initial moisture content of the stream falls and, in the ideal case of complete dryness and the absence of any leakage of the external atmosphere into the system, the moisture content would return to zero. Thus the pressure at position A falls and in the ideal case above mentioned it would be equal to the pressure at the point B. This results in the production of a reading on the instrument 23 which gradually falls to a constant reading near zero as the drying of the articles within the drying chamber approaches completion.

The method and apparatus described above relate to the simple case in which there are no disturbing influences which take away the conditions controlling that case. It assumes that there is, for example, no leakage of comparatively dry air into the system. It will be appreciated that in the application of the method it will not usually be brought into use until a high vacuum has been attained and the drying process is well advanced. If now there is a leakage of comparatively dry air into the drying apparatus this will add a pressure gradient throughout the apparatus which will be large relative to the gradient which would otherwise exist on the downstream side of the place of treatment for moisture removal, that is at position B. In such a case the simple arrangement of pressure gauges 11, 12 in Figure 1 will show a tendency, as drying proceeds, to move not to equality but to a constant large difference. The value of this difference will be unknown in advance as it depends on the unascertained value of the leakage. This condition can be taken care of by the use of an additional gauge or gauges in the following manner.

It has been assumed that the upstream and downstream lengths of the pipe 4, that is on each side of the refrigerated chamber 6, have the same resistance to flow so that the same stream of gas through them will produce the same pressure gradients. This is still assumed in the following description but it will be recognised that other conditions can be provided for if advantageous or convenient for other reasons. Referring to Figure 2, there is now provided an arrangement of four pressure gauges 11a, 11b, 12a and 12b. Features of this arrangement which are common to that described are, for convenience, given the same references. Two of the gauges, 11a and 11b, are connected by branch pipes 27, 28 to positions A1, A2 spaced apart along the upstream portion of the exhaust pipe 4. The other two gauges 12a and 12b are similarly connected by branch pipes 29 and 30 to positions B1, B2 on the downstream portion of the pipe 4. The positions A1, A2, B1, and B2 are so selected that the distances A1—A2 and B1—B2 are equal. There is provided a bridge 31, the main elements of which are similar to those described with reference to the bridge 16 in Figure 1. The bridge is provided with switching means to enable a comparison to be made between the resistances of either gauges 11a and 11b or gauges 12a and 12b. For this purpose the battery terminal which in the previous arrangement was connected to the junction 20 between the gauges 11 and 12 is now connected to a common and permanent connection 32 between the two middle terminals of a two-way double-throw switch 33. The left-hand pair of switch terminals 34, 35 are individually connected to one terminal of each of the gauges 11a and 11b. The other terminal of the gauge 11a is permanently connected to the bridge junction 21, and the corresponding terminal of the gauge 11b is similarly connected to the opposite bridge junction 22. It will be seen from the drawing that when the switch 33 is closed on the left-hand contacts 34 and 35 the bridge circuit will be completed for comparing the resistances of the elements of the gauges 11a and 11b, thereby giving an indication of the pressure drop across the portion A1—A2 of the exhaust pipe 4. The other gauges 12a, 12b are similarly connected to the right hand pair of switch terminals 36, 37 and the bridge junctions 21, 22 so that by closing the switch 33 to the right hand side the bridge circuit is completed for observing the pressure drop across the portion B1—B2 of the pipe 4. In operation the drying process is continued until the pressure drop across A1—A2 is equal or substantially equal to that across B1—B2, thereby indicating complete or substantially complete dryness.

In the arrangement shown in Figure 3 the two gauges 11b and 12a have been replaced by a single gauge 38 connected by a branch pipe 39 to the interior of the refrigeration chamber 6 at the point 6. A double-pole double-throw switch 40 is provided for connecting the three gauges to the bridge 31 in such a manner that for determining the pressure gradient on the upstream side of the chamber 6 the gauges 11a and 38 are compared and for determining the conditions on the downstream side the gauges 38 and 12b are compared. One terminal of each gauge is permanently connected to one junction point 20 with the battery 15. The other terminal of gauge 11a is connected to the lefthand contact 41 of the upper pair of switch contacts 41 and 42, the corresponding terminal of gauge 38 is connected to the lefthand contact 42 and by closing the switch in the upper position these contacts 41 and 42 are joined through the central switch contacts 43 and 44 to the bridge junctions 21 and 22 respectively. The upper righthand switch contact 42 is permanently cross-connected to the lower lefthand switch contact 45, thus permanently connecting to this contact the last mentioned terminal of the central gauge 38. To the lower righthand switch contact 46 is connected the otherwise free terminal of the remaining gauge 12b. By moving the switch 40 into the lower position the gauges 38 and 12b are connected to the bridge junctions 21 and 22 respectively. This arrangement of three gauges can thus be selectively connected, by means of the switch 40, into the bridge to obtain an indication on the instrument 23 of the pressure gradients on both sides of the refrigerating chamber 6, that is between A1 and C and between C and B1. In all cases the variable resistor 24 is used to control the sensitivity of the instrument 23.

What we claim as our invention is:

1. Apparatus for ascertaining the progress of a drying operation in a chamber under vacuum, comprising an exhaust pump, a pipe line for connecting the drying chamber and pump, a condensing chamber inserted in the pipe line, low pressure gauges connected on the upstream side of the condensing chamber with the interior of the pipe line to measure the pressure gradient over a section thereof and similar low pressure gauges connected on the downstream side of the condensing chamber with the interior of the pipe line to measure the pressure gradient over a section having a resistance to flow equal to that of the first-mentioned section.

2. Apparatus for ascertaining the progress of a drying operation in a chamber under vacuum, comprising an exhaust pump, a pipe line of uniform section for connecting the drying chamber and pump, a condensing chamber in the pipe line, a first pair of similar hot filament electric low pressure gauges connected to two spaced points in the pipe on the upstream side of the condensing chamber, a second pair of similar gauges connected to two similarly spaced points in the pipe on the downstream side of the condensing chamber, a bridge network and switching means for connecting one pair or the other of the gauges into the network for comparing the pressures to which the gauges are exposed.

3. Apparatus for ascertaining the progress of a drying operation in a chamber under vacuum, comprising an exhaust pump, a pipe line of uniform section for connecting the drying chamber and pump, a condensing chamber in the pipe line, a first hot filament electric low pressure gauge connected with the interior of the pipe line on the upstream side of and at a fixed distance from the condensing chamber, a second similar gauge connected with the pipe line at an equal distance from and on the downstream side of the condensing chamber, a third similar gauge connected with the interior of the condensing chamber, a bridge network for comparing the gauge pressures and switching means for connecting the gauges into the network, the switching means in one setting connecting the first and third gauges to the network, and in another setting connecting the third and second gauges to the network.

References Cited in the file of this patent

FOREIGN PATENTS

| | | |
|---|---|---|
| 914,458 | France | Oct. 9, 1946 |
| 1,047,369 | France | Dec. 14, 1953 |